United States Patent [19]
Tribelhorn, Jr.

[11] Patent Number: 5,114,390

[45] Date of Patent: May 19, 1992

[54] SHEEP TREADMILL

[76] Inventor: Victor E. Tribelhorn, Jr., 41564 County Rd. J, Yuma, Colo. 80759

[21] Appl. No.: 611,028

[22] Filed: Nov. 9, 1990

[51] Int. Cl.⁵ .............................................. A63B 22/02
[52] U.S. Cl. ....................................... 482/54; 482/51; 119/29
[58] Field of Search ...................... 272/69, 170; 119/29

[56] References Cited

U.S. PATENT DOCUMENTS

| | | | |
|---|---|---|---|
| 736,360 | 8/1903 | Burgess | 119/29 |
| 3,709,197 | 1/1973 | Moseley | 119/29 |
| 4,095,561 | 6/1978 | Ruetenik | 119/29 |
| 4,266,508 | 5/1981 | McNulty | 119/29 |
| 4,332,217 | 6/1982 | Davis | 272/69 X |
| 4,938,469 | 7/1990 | Crandell | 272/70 X |

Primary Examiner—Richard J. Apley
Assistant Examiner—D. F. Crosby
Attorney, Agent, or Firm—Dean P. Edmundson

[57] ABSTRACT

A treadmill is described for exercising and conditioning a plurality of sheep simultaneously. The treadmill enables the sheep to be positioned in a side-by-side arrangement. The angle of incline of the treadmill is such that the sheep are properly conditioned without causing undesirable muscle build-up at the top of the loin and without causing physiological abnormalities with muscle attachment of the hip to the loin area. The speed of the treadmill is also controlled to provide optimum conditioning and exercising.

10 Claims, 2 Drawing Sheets

SHEEP TREADMILL

FIELD OF THE INVENTION

This invention relates to exercise equipment. More particularly, this invention relates to treadmills. Even more particularly, this invention relates to treadmills for exercising sheep.

BACKGROUND OF THE INVENTION

Sheep which are shown in fairs and livestock shows must be in very good shape to be competitive, due to the very good quality of other sheep being shown. Prestige and profits associated with showing prize-winning animals are highly sought. As a result, there is much competition in this field.

Traditionally, sheep have been exercised by chasing them in an alleyway or similar enclosure to keep them fit and to increase muscle bulk. Sometimes sheep are chased over hurdles to further increase the size of their rear leg muscles.

These prior techniques involve various disadvantages. For example, in order to chase sheep in an alleyway a person must commit to spend the necessary time and a fair amount of effort. Even with such time and effort, however, the results can be less than desired. For example, there may have been too little consistent exercise to have an observable effect on the muscles of the sheep. Also, sheep can become injured when they are chased over hurdles or obstacles.

Although the use of a treadmill for sheep has been more recently proposed, the type of treadmill proposed has various drawbacks. For example, it elevates the front quarters of the sheep to a very high level relative to the rear quarters. This can be harmful to the sheep because it can create a protrusion or undesired muscle build-up at the top of the loin. Also, use of such a treadmill can cause physiological abnormalities with muscle attachment of the hip to the loin area.

Another disadvantage of such treadmill is that it is elongated and very narrow. Although multiple sheep could be exercised at the same time, the sheep must be positioned in nose-to-tail, single file arrangement (i.e., all the sheep are in a single row). This results in the front sheep being elevated a significant distance. In order to load the sheep onto the elevated treadmill the first sheep must enter at the lower end and be led to the upper end of the apparatus, then the second sheep must also enter at the lower end and be led to the next position. Finally, the third sheep can enter the lower end of the apparatus. After being exercised, the sheep must either be removed from the apparatus by backing them out one at a time, or else it is necessary to build a hill adjacent the upper end of the apparatus to enable the sheep to jump out from the upper end of the apparatus. This is extremely undesirable and possibly dangerous.

There has not heretofore been provided a treadmill suitable for exercising sheep in a convenient and safe manner.

Summary of the Present Invention

In accordance with the present invention there is provided a treadmill especially for use in exercising and conditioning sheep, primarily for show or exhibition purposes. The treadmill comprises:
(a) a frame having a lower end and an upper end;
(b) a belt member extending between the upper and lower ends of the frame; the belt being capable of supporting a plurality of sheep in side-by-side manner;
(c) drive means for driving the belt at a speed in the range of about 14 to 22 inches per second; and
(d) front support means for supporting the front legs of the sheep.

The belt is capable of simultaneously supporting a plurality of sheep in side-by-side fashion so that all of the sheep can be exercised and conditioned simultaneously. Then the sheep can be simply led off the treadmill after the belt has been stopped.

Because the sheep can be supported in side-by-side fashion, none of the sheep are elevated above the others. Multiple sheep can be positioned on the treadmill of this invention in any desired order, and the sheep can be located in any desired position on the belt. There is no need to put the sheep on the belt or remove them in any particular order.

The angle of the backbone of the sheep on the treadmill (relative to a horizontal plane) is in the range of about 10° to 25° (more preferably 10° to 20°). Also, the angle of the backbone of the sheep relative to the plane of the belt is in the range of 0° to 20°. These considerations prevent undesirable development of a muscle protrusion at the top of the loin.

Other advantages of the treadmill of this invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
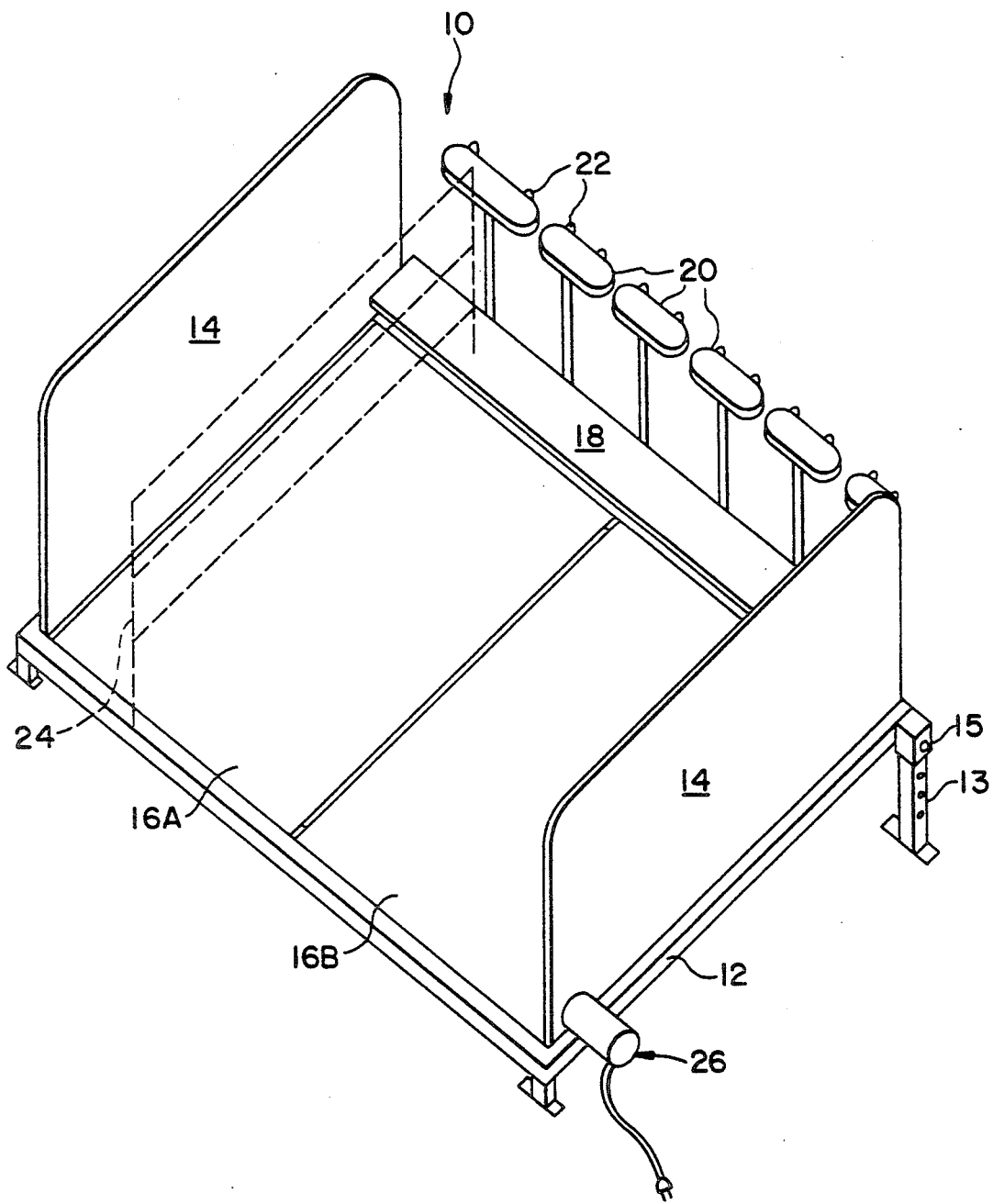
FIG. 1 is a perspective view of a preferred embodiment of treadmill of this invention.

In the drawings there is illustrated a preferred embodiment of treadmill 10 for exercising and conditioning sheep in a safe, efficient, and effective manner. The treadmill comprises a frame 12 which includes adjustable legs 13 which enables the front of the apparatus to be elevated to a desirable height.

One or more movable belts 16A and 16B are carried on the frame in a manner such that they can be rotated at a desired speed by electric motor 26. A plurality of sheep can be positioned on belts 16A and 16B in a side-by-side fashion. Feed troughs 20 are positioned along the front of the apparatus so that the sheep can be fed at the same time they are being exercised, if desired.

In the embodiment shown in FIG. 1, as many as six sheep may be accommodated on the treadmill simultaneously in side-by-side fashion. The halter on each sheep can be secured to a tie ring 22. If desired, an upright divider 24 may be positioned between adjacent sheep on the treadmill. Only one such divider is shown in FIG. 1 but there may be additional dividers, if desired. There may also be included a panel 14 at each side of the treadmill, as illustrated.

Figure 2:
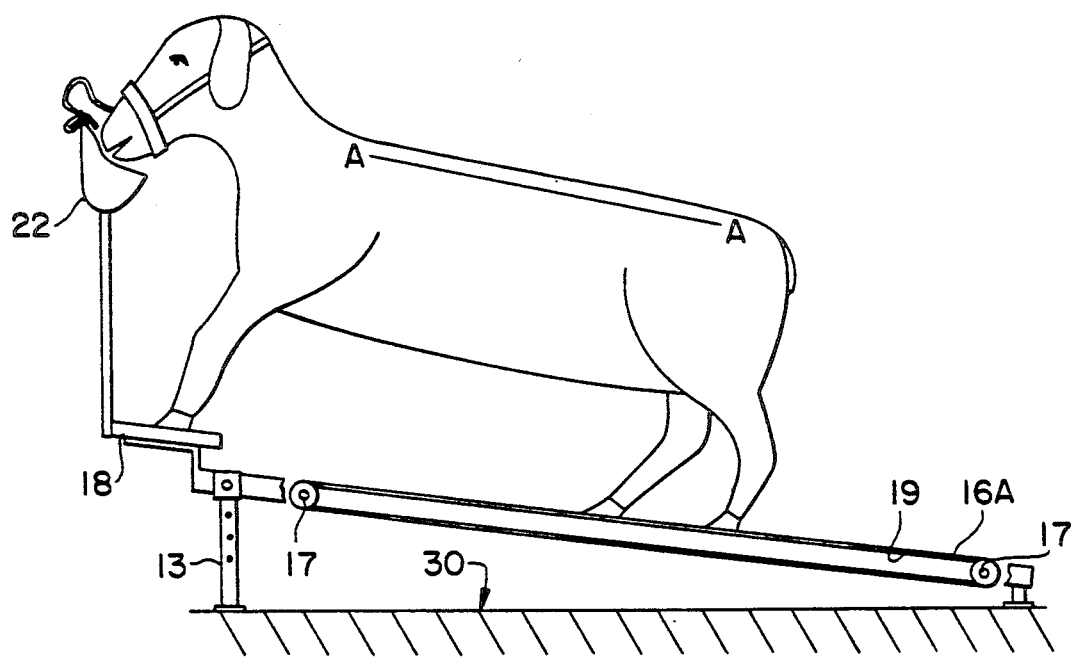
FIG. 2 is a side elevational, partially cut-away, view showing use of the treadmill of FIG. 1 for exercising and conditioning sheep.

A front support platform 18 is located along the front edge of the treadmill to support the front feet of each sheep. As shown in FIG. 2, the platform 18 is elevated a few inches above the level of the endless belts 16A and 16B.

Preferably the angle of the backbone of the sheep (depicted by line A—A) relative to the plane of the belt is in the range of about 0° to 20°. Also, the angle between the backbone and a horizontal plane (e.g., ground level 30) is in the angle of about 10° to 25° (preferably 10° to 20°).

If the foregoing angles are greater than those just described, then a protrusion or undesired muscle build-up at the top of the loin can be created. It is also possible for physiological abnormalities with muscle attachment of the hip to the loin area to be caused.

The endless belt 16A shown in FIG. 2 is carried by rollers 17. A planar support plate 19 extends across the treadmill under the belt, as illustrated. The top portion of the belt rests on and slides over the plate 19 when the belt is powered by motor 26.

The size of the treadmill may vary. The embodiment shown in FIG. 1 is capable of accommodating six sheep simultaneously. Of course, the treadmill could be made to accommodate any desired number of sheep in a side-by-side manner.

The sheep can be simply led onto the treadmill in any desired order. Similarly, they can be taken off the treadmill in any desired order. The sheep are not elevated to any appreciable extent. All of the sheep are supported on the same plane.

The motor which drives the endless belts 16A and 16B is set such that the belts move at a speed in the range of about 14 to 22 inches per second (preferably at a speed of about 18 inches per second). If the speed is too slow the sheep will short-step and accordingly do not learn to walk properly. On the other hand, if the belts move too fast then the sheep can become stressed. Accordingly, the belt speed specified herein is extremely important for this invention.

Other variants are possible without departing from the scope of this invention.

What is claimed is:

1. A treadmill for exercising and conditioning a plurality of sheep simultaneously, said treadmill comprising:
   (a) frame means having a lower end and an upper end; wherein said upper end is higher than said lower end;
   (b) a belt member extending between the upper and lower ends of the frame; wherein said belt is capable of supporting a plurality of sheep in side-by-side manner;
   (c) motor drive means for driving said belt at a speed in the range of about 14 to 22 inches per second; and
   (d) raised and stationary front support means for supporting the front legs of said sheep above the plane of said belt means.

2. A treadmill in accordance with claim 1, wherein the backbones of said sheep are inclined at an angle of about 10° to 25° relative to a horizontal plane, and wherein the backbones are disposed at an angle in the range of about 0° to 20° relative to said belt.

3. A treadmill in accordance with claim 1, wherein said upper end of said frame further includes adjustable leg members which enable the height of said upper end to be adjusted relative to a horizontal plane.

4. A treadmill in accordance with claim 1, further including a feed trough supported above said upper end of said frame.

5. A treadmill in accordance with claim 1, further including dividers for separating said sheep on said belt.

6. A treadmill for exercising and conditioning a plurality of sheep simultaneously, said treadmill comprising:
   (a) frame means having a lower end and an upper end; wherein said upper end is higher than said lower end;
   (b) a belt member extending between the upper and lower ends of the frame; wherein said belt is capable of supporting a plurality of sheep in side-by-side manner;
   (c) motor drive means for driving said belt at a speed in the range of about 4 to 22 inches per second; and
   (d) raised and stationary front support means for supporting the front legs of said sheep above the plane of said belt means;
wherein the backbones of said sheep are inclined at an angle of about 10° to 25° relative to a horizontal plane, and wherein the backbones are disposed at an angle in the range of about 0° to 20° relative to said belt.

7. A treadmill in accordance with claim 6, further comprising leg members for supporting said upper end of said frame; wherein said leg members are adjustable.

8. A treadmill in accordance with claim 6, further including a feed trough supported above said upper end of said frame.

9. A treadmill in accordance with claim 6, further including dividers for separating said sheep on said belt.

10. A method for simultaneously conditioning a plurality of sheep, comprising the steps of:
   (a) providing an endless belt member;
   (b) supporting said belt member in an inclined plane to provide a raised portion;
   (c) providing stationary support means adjacent said raised portion of said belt member;
   (d) supporting a plurality of sheep on said belt member in side-by-side manner; wherein the front legs of said sheep are supported on said stationary support means and the rear legs of said sheep are supported on said belt member; wherein the backbone of said sheep are inclined at an angle of about 10° to 25° relative to a horizontal plane, and wherein the backbones are disposed at an angle in the range of about 0° to 20° relative to said belt member;
   (e) driving said belt member at a speed in the range of about 14 to 22 inches per second in a manner such that said sheep are exercised and conditioned.

* * * * *